United States Patent
Bollé

[11] Patent Number: 5,646,708
[45] Date of Patent: Jul. 8, 1997

[54] COUPLING SYSTEM FOR ASSEMBLING A SPECTACLE FRAME AND THE SIDE-PIECES

[75] Inventor: Maurice Bollé, Oyonnax, France

[73] Assignee: Establissements Bolle, Oyonnax, France

[21] Appl. No.: 523,960

[22] Filed: Sep. 6, 1995

[30] Foreign Application Priority Data

Sep. 8, 1994 [FR] France .................. 94 10571

[51] Int. Cl.⁶ .................. G02C 5/22; G02C 5/14
[52] U.S. Cl. .................. 351/153; 351/121; 16/228
[58] Field of Search .................. 351/111, 113, 351/114, 119, 121, 153; 16/228

[56] References Cited

U.S. PATENT DOCUMENTS

| 2,046,706 | 7/1936 | Sundstrom | 351/121 |
| 4,354,744 | 10/1982 | Bonomi | 351/121 |
| 5,032,017 | 7/1991 | Bolle | 351/116 |
| 5,035,498 | 7/1991 | Bolle | 351/116 |
| 5,080,476 | 1/1992 | Monin | 351/119 |

FOREIGN PATENT DOCUMENTS

| 0 067 110 | 12/1982 | European Pat. Off. . |
| 2690761 | 11/1993 | France . |
| 2103829 | 2/1983 | United Kingdom . |

Primary Examiner—Huy Mai
Attorney, Agent, or Firm—Jacobson, Price, Holman & Stern, PLLC

[57] ABSTRACT

The coupling system 1 is composed of an elongated piece shaped, on one side to form a claw, the members (10a, 10b) of which are designed to grip the end of a side-piece of a pair of spectacles. On the other side, the coupling system bears a double hinge knuckle 12 which can receive a tenon 13 forming a pivot, which penetrates a through orifice 5 provided on the side of the front face 2 of the spectacles and is retained by its anchoring head 17. The central portion 18 of the coupling system, between the claw and the double knuckle, is of lesser thickness, and is thus elastic and deformable.

8 Claims, 1 Drawing Sheet

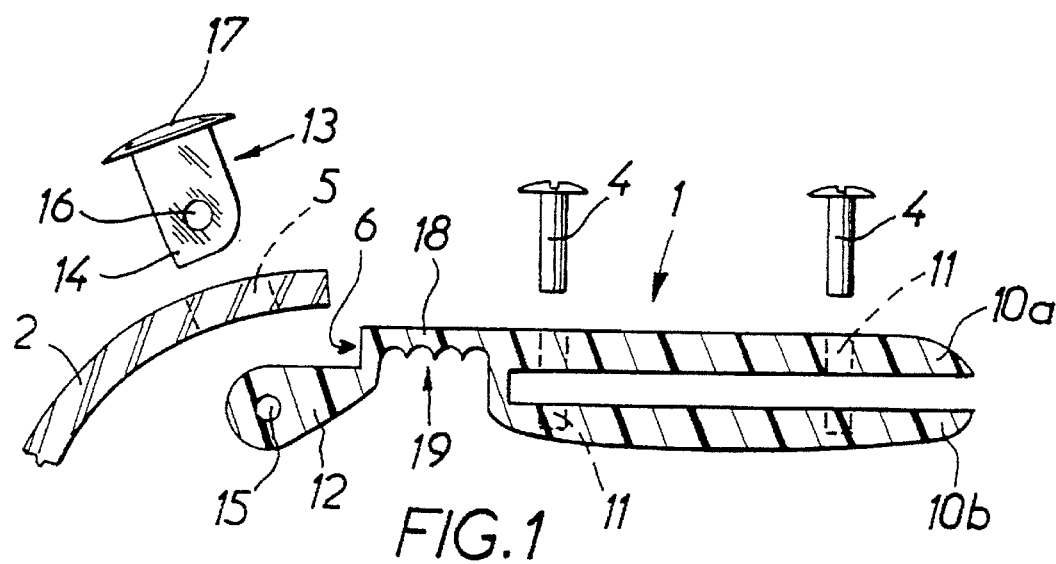
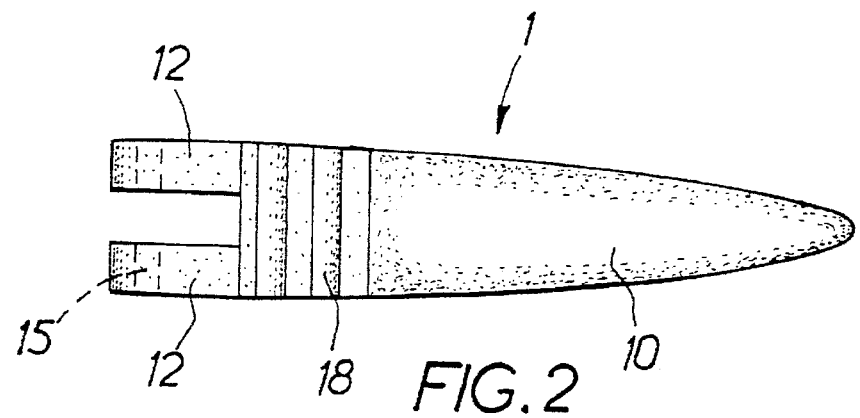
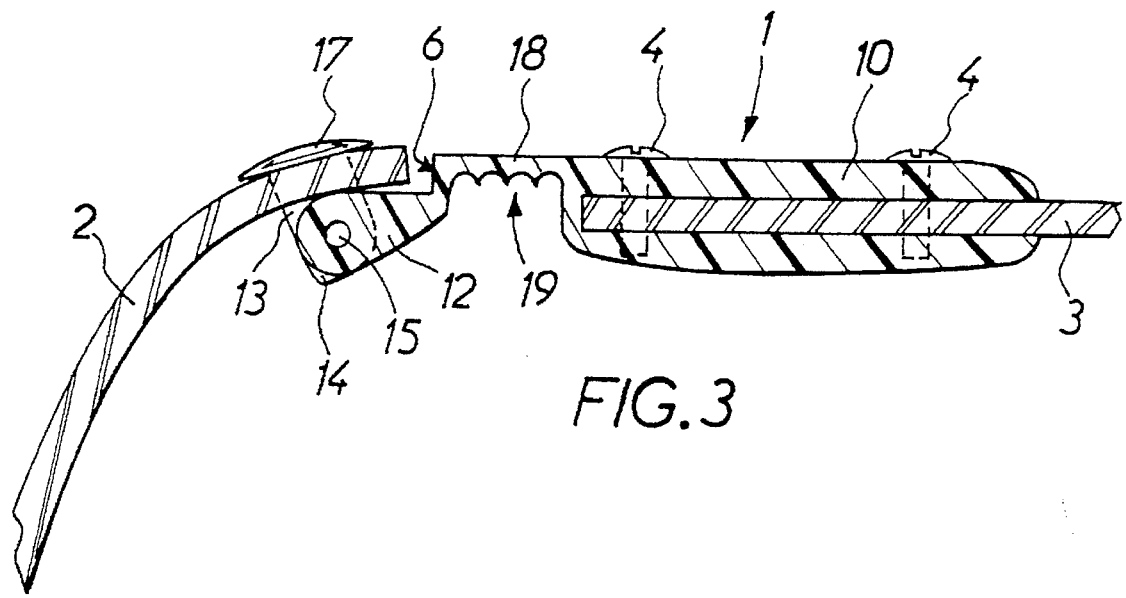

COUPLING SYSTEM FOR ASSEMBLING A SPECTACLE FRAME AND THE SIDE-PIECES

The invention relates to a spectacle frame and, more precisely, to a dismountable coupling system permitting the assembly of the face of the spectacles with the side-pieces.

The harness in question is designed for all types of spectacles and, in particular, for metallic spectacles the face and side-pieces of which are particularly rigid, which limits the elasticity and the flexibility of the whole when the usual connecting devices of the hinged, or other, type are used.

The coupling system provided by the invention permits instantaneous mounting of the side-pieces onto the spectacles and imparts to the frame a degree of elasticity that enables the side-pieces to be spread apart despite their intrinsic rigidity. In addition, this coupling system serves as a flexible shock absorber for the side-pieces, as well as a providing stops enabling their angles of opening to be limited and adjusted.

One main object of the present invention thus consists of a dismountable coupling system for assembling a spectacle frame and its side-pieces, which coupling system is composed of an elongated piece, shaped on one side to form a claw for attaching it to a side-piece, and which bears, on the other side, a double knuckle receiving a tenon forming a pivot connected to the front face of the spectacles, the said coupling system being provided, between the claw and the double knuckle, with a central portion of lesser thickness which is elastic and deformable.

According to a special characteristic of the invention, the tenon has, on one side, a boss designed to engage in the double knuckle and, on the other side, an anchoring head, the width of which is greater than that of a through orifice provided on the sides of the front face of the spectacles.

Advantageously, the central portion of the said coupling system bears corrugations and, between the central portion and the double knuckle, the outer face of the coupling piece is machined to form a shoulder acting as a stop for the side-piece of the spectacles.

Further particular characteristics and advantages of the invention will emerge from the following description of a form of embodiment given by way of example, wherein reference is made to the annexed drawings, which show:

FIG. 1, an exploded cross-sectional view of the coupling system and its fixing members;

FIG. 2, a bottom view of the coupling system shown in FIG. 1.

FIG. 3, a cross-sectional view of the coupling system mounted on a spectacle frame.

The figures show a dismountable coupling system, generally designated by reference number 1, by means of which hinged connection is provided between the front face, 2, of the spectacles and each of its side-pieces 3, the frame as a whole being metallic, with the exception of the said coupling system, which is advantageously of polyamide.

The said coupling system 1, which forms an intermediate member between the side-pieces and the face of the spectacles, is a elongated piece, one end of which is shaped to form a claw 10 between the members (10a, 10b) of which is engaged the plane end of side-piece 3. The members of the claw are pierced with orifices 11 to permit the passage of screws 4 for fixing the side-piece, which is, itself, pierced with corresponding holes. Other means for fixing the side-piece in the claw, for example by riveting or snap fastening, could, of course, be adopted.

The other end of the coupling system carries a double knuckle 12, provided with openings 15, designed to receive a tenon, 13, which will cause this piece to be attached to the end of the face of the spectacles 2. Tenon 13, which forms a pivot, has, on one side, a boss 14 designed to engage in double knuckle 12, a mortise, 16, being formed in the tenon to allow through a screw, a pin or a rivet, opposite openings 15, in order to ensure the hinging of the coupling system. On the other side, tenon 13 has an anchoring head 17, the width of which is greater than that of a through orifice 5 provided on the two sides of the front face 2 of the spectacles.

The central portions 18, of coupling system 1, between claw 10 and double knuckle 12, is of lesser thickness and advantageously bears corrugations 19. It will be noted that, between this central portion 18 and double knuckle 12, the outer face of coupling piece 1 is machined and the shoulder 6 thus obtained serves as a stop for side-piece 3 to limit and adjust the opening thereof.

To assemble a spectacle frame and its side-pieces with the help of the coupling system thus described, the first step is to place side-piece 3 between the members of piece 10, after which it is fixed using screws 4. Tenon 13 is then engaged in orifice 5, with anchoring head 17 coming into abutment with front face 2. Boss 14 is placed between the members of double knuckle 12, and the whole is locked to the body of the coupling system by a pin or a rivet. The bearing of the double knuckle on the inner face of the spectacle frame prevents removal of the pivot and ensures that the whole remains integral. Assembly is thus simple and instantaneous.

The existence of a corrugated central portion 18 of lesser thickness gives the coupling system elasticity, it being possible for deformation to take place in this area. The frame is thus endowed with spreading flexibility despite the rigidity of the metallic side-pieces. The deformability of the coupling system thus enables it to serve as a shock absorber for the metal side-pieces, which can made to fit wearers of differing facial widths.

I claim:

1. A coupling for assembling a spectacle frame and spectacle frame side-pieces, said coupling comprising an elongated piece, shaped on one side to form a claw (10) for attaching it to a side-piece (3) said elongated piece including a double knuckle (12) on a side thereof opposite to the claw, a tenon (13) mounted on the spectacle frame forming a pivot connection with the double knuckle on said elongated piece, said elongated piece including a reduced thickness central portion between the claw and the double knuckle, said elongated piece and reduced thickness central portion being constructed of elastic material to enable the claw to pivot in relation to the double knuckle.

2. A coupling according to claim 1, wherein said tenon (13) has, on one side, a boss (14) designed to engage in the double knuckle (12) and, on the other side, an anchoring head (17), the width of said anchoring head being greater than that of a through orifice (5) provided on a side of the spectacle frame.

3. A coupling according to claim 1, wherein the central portion (18) of said elongated piece (1) includes corrugations (19).

4. A coupling according to claim 1, wherein an outer face of the elongated piece (1) is machined to form a shoulder (6) acting as a stop for the side-piece (3) when engaging a side edge of the spectacle frame.

5. A coupling for connecting eyeglass side pieces to side edge portions of a pair of spectacle eyepieces, said coupling comprising an elongated coupling member constructed of plastic material, one end of said coupling member including a slot in which a side piece is anchored, an opposite end of said coupling member including a hinge knuckle, a tenon mounted on a side edge portion of an eyepiece and extending from an inner surface of the eyepiece, said hinge knuckle being pivotally connected to said tenon, a portion of said coupling member adjacent the hinge knuckle having a thickness less than the thickness of the hinge knuckle and the slotted end of the coupling member, said less thickness portion of plastic material defining an elastic flexible hinge area between the hinge knuckle and the slotted end of the coupling member in spaced relation to the pivotal connection between the hinge knuckle and tenon.

6. The coupling as defined in claim 5 wherein said hinge knuckle and said less thickness portion of the coupling member are connected to each other by an offset area defining a stop engaging a side edge of an eyepiece when the slotted end of the coupling member and the side piece anchored thereto are pivoted outwardly beyond a normal generally perpendicular relation to the eyepiece, said elastic flexible hinge area enabling additional outward movement of the side piece when the stop engages the eyepiece.

7. The coupling as defined in claim 6 wherein said less thickness portion includes vertical corrugations in a vertical surface thereof, said vertical corrugations generally paralleling an axis of the pivotal connection between the hinge knuckle and tenon to maintain said side piece in generally the same vertical attitude in relation to the eyepiece during pivotal movement of the side piece.

8. The coupling as defined in claim 7 wherein said eyepiece includes an opening adjacent the side edge thereof, said tenon extending through said opening and being anchored to the eyepiece, said hinge knuckle including vertically spaced members receiving said tenon therebetween to maintain the coupling member and side piece in generally the same vertical attitude in relation to the eyepiece during pivotal movement of the side piece.

* * * * *